(12) United States Patent
Hoshuyama

(10) Patent No.: US 9,909,949 B2
(45) Date of Patent: Mar. 6, 2018

(54) LEAKAGE DETERMINATION METHOD, LEAKAGE DETERMINATION SYSTEM, AND PROGRAM

(71) Applicant: NEC Corporation, Minato-ku, Tokyo (JP)

(72) Inventor: Osamu Hoshuyama, Tokyo (JP)

(73) Assignee: NEC CORPORATION, Tokyo (JP)

(*) Notice: Subject to any disclaimer, the term of this patent is extended or adjusted under 35 U.S.C. 154(b) by 389 days.

(21) Appl. No.: 14/431,867

(22) PCT Filed: Sep. 26, 2013

(86) PCT No.: PCT/JP2013/075973
§ 371 (c)(1),
(2) Date: Mar. 27, 2015

(87) PCT Pub. No.: WO2014/050923
PCT Pub. Date: Apr. 3, 2014

(65) Prior Publication Data
US 2015/0241297 A1    Aug. 27, 2015

(30) Foreign Application Priority Data

Sep. 28, 2012  (JP) .................... 2012-218037

(51) Int. Cl.
*G01M 3/24* (2006.01)
*E03B 7/00* (2006.01)

(52) U.S. Cl.
CPC .............. *G01M 3/243* (2013.01); *E03B 7/003* (2013.01)

(58) Field of Classification Search
CPC ............ G01M 3/243; E03B 7/003; F17D 5/06
See application file for complete search history.

(56) References Cited

U.S. PATENT DOCUMENTS

| | | | |
|---|---|---|---|
| 5,974,862 A | 11/1999 | Lander et al. | |
| 6,389,881 B1* | 5/2002 | Yang ..................... | G01M 3/243 73/40.5 A |
| 9,766,151 B2* | 9/2017 | Hoshuyama ........... | G01M 3/00 |
| 2011/0161037 A1 | 6/2011 | Sutherland | |

FOREIGN PATENT DOCUMENTS

| | | |
|---|---|---|
| GB | 2378756 A | 2/2003 |
| JP | 10-185744 A | 7/1998 |
| JP | 2006-003311 A | 1/2006 |
| JP | 2008-051776 A | 3/2008 |

OTHER PUBLICATIONS

Extended European Search Report for EP Application No. EP13842607.7 dated Jun. 15, 2016.
International Search Report for PCT Application No. PCT/JP2013/075973, dated Nov. 26, 2013.

* cited by examiner

*Primary Examiner* — Bryan Bui

(57) ABSTRACT

The present invention is a leakage determination method comprising: comparing a correlation profile including a cross-correlation function obtained from measurement data measured at at least a pair of measurement positions and position information for the measurement positions, and a correlation profile at the time of the leakage determination including the cross-correlation function obtained from the measurement data measured at the pair of measurement positions and the position information for the measurement positions; and determining leakage.

13 Claims, 10 Drawing Sheets

FIG. 4

| CROSS-CORRELATION FUNCTION | POSITIONS OF VIBRATION SENSOR PAIR | YEAR, MONTH, DAY, HOUR, MINUTE, AND DAY OF THE | WEATHER INFORMATION | SOUND INFORMATION | LEAKAGE INFORMATION |
|---|---|---|---|---|---|
| $\phi_1$ | S1, S4 | XXXX/XX/XX xx:xx XXX | XXXX | XXXX | XXXX |
| .. | .. | .. | .. | .. | .. |

CROSS-CORRELATION FUNCTION Φ1 BETWEEN
VIBRATION SENSOR POSITIONS S1 TO S4

CROSS-CORRELATION FUNCTION Φ2 BETWEEN
VIBRATION SENSOR POSITIONS S1 TO S4 FOUND BY
MEASUREMENT

CORRELATION FUNCTION Φ1 BETWEEN S1 TO S4

CORRELATION FUNCTION Φ2 BETWEEN S1 TO S4

CORRELATION FUNCTION $\Phi_{AB}(T)$ BETWEEN S1 TO S4 FOUND BY MEASUREMENT

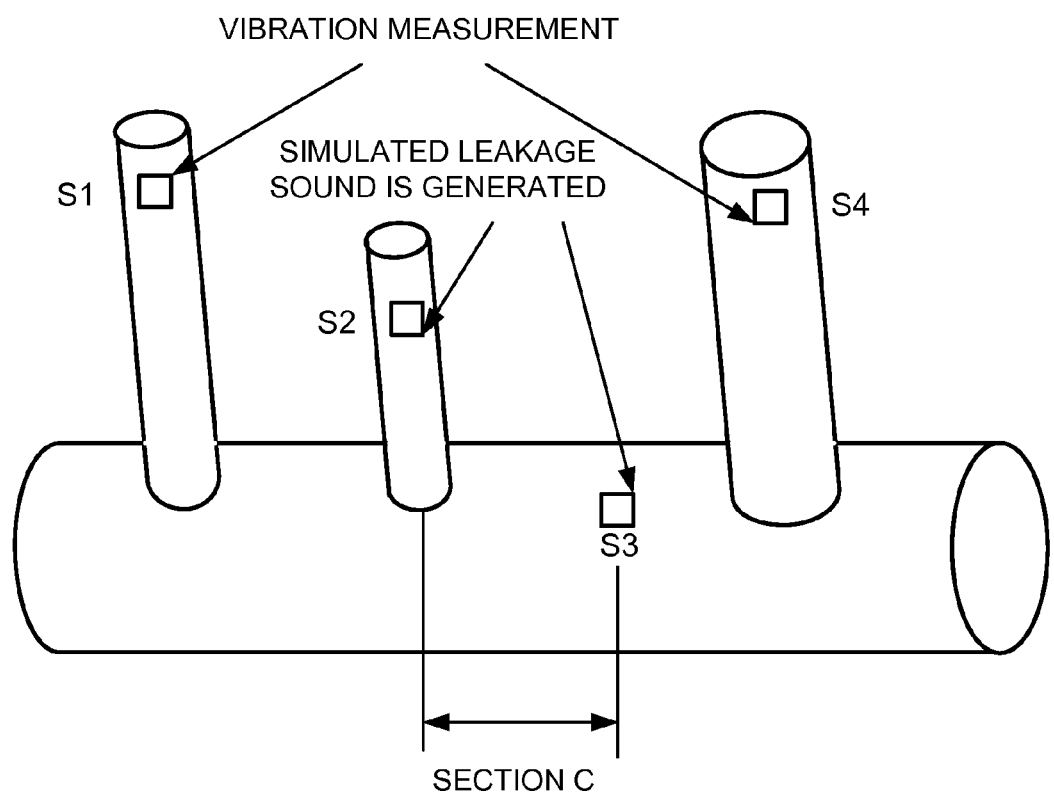

LEAKAGE DETERMINATION METHOD, LEAKAGE DETERMINATION SYSTEM, AND PROGRAM

This application is a National Stage Entry of PCT/JP2013/075973 filed on Sep. 26, 2013, which claims priority from Japanese Patent Application 2012-218037 filed on Sep. 28, 2012, the contents of all of which are incorporated herein by reference, in their entirety.

TECHNICAL FIELD

The present invention relates to a leakage determination method, a leakage determination system, and a program.

BACKGROUND ART

Conventionally, there may arise a problem that water or the like leaks in a water pipe, a gas pipe, or the like buried under the ground. To cope with the above problem, a method for detecting leakage in a pipe or the like is studied.

As one of the above methods, a method is used in which an examiner confirms vibrations by his/her ears and detects water leakage in a pipe or the like. This method is a method in which the examiner listens to a water leakage sound by his/her ears from a land surface, specifies a position to listen to the water leakage sound best, investigates the pipe or the like, and confirms whether leakage occurs.

However, in this method, since the examiner investigates vibrations in the pipe or the like by his/her ears, an experienced skill is required in order to detect water leakage with high accuracy.

Consequently, proposed is a system in which vibration detection devices are arranged in both ends of a measurement section of the pipe, detected pipe vibrations are transmitted to an external water leakage position analysis unit, and it detects a water leakage position in the pipe (Patent Literature 1).

CITATION LIST

Patent Literature

Patent Literature 1: Japanese Laid-open Patent Publication No. 2008-51776

SUMMARY OF INVENTION

Technical Problem

However, in the present invention disclosed in Patent Literature 1, a measurement terminal that measures vibrations, etc. of pipes is arranged in each predetermined measurement section and simply determines water leakage from only measurement data, and factors involved in ambient surrounding of pipes are not considered. Accordingly, when the measurement data depends on ambient surrounding (for example, a change in noise due to a difference of a time zone or a day of the week, weather or sound), leakage is incapable of being normally determined.

Consequently, in view of the foregoing, it is an object of the present invention to provide a leakage determination method, a leakage determination system, and a program that are capable of determining leakage in consideration of ambient surrounding.

Solution to Problem

The present invention is directed to a leakage determination method comprising: comparing a correlation profile including a cross-correlation function obtained from measurement data measured at at least a pair of measurement positions and position information for the measurement positions, and a correlation profile at the time of the leakage determination including the cross-correlation function obtained from the measurement data measured at the pair of measurement positions and the position information for the measurement positions; and determining leakage.

The present invention is directed to a leakage determination system comprising: a correlation profile database in which a correlation profile including a cross-correlation function obtained from measurement data measured at at least a pair of measurement positions and position information for the measurement positions is stored, a correlation profile acquisition means that acquires a correlation profile at the time of the leakage determination including the cross-correlation function obtained from the measurement data measured at the pair of measurement positions and the position information for the measurement positions; and a leakage determination means that compares a correlation profile of the correlation profile database and the correlation profile acquired by the correlation profile acquisition means and determines leakage.

The present invention is directed to a program for causing a computer to perform a procedure comprising: comparing a correlation profile including a cross-correlation function obtained from measurement data measured at at least a pair of measurement positions and position information for the measurement positions, and a correlation profile at the time of the leakage determination including a cross-correlation function obtained from the measurement data measured at the pair of measurement positions, and the position information for the measurement positions; and determining leakage.

Advantageous Effects of Invention

The present invention is capable of determining leakage in consideration of ambient surrounding.

BRIEF DESCRIPTION OF DRAWINGS

FIG. 4 illustrates one example of a correlation profile.

FIG. 10 illustrates a vibration propagation speed database 30.

DESCRIPTION OF EMBODIMENTS

Figure 1:
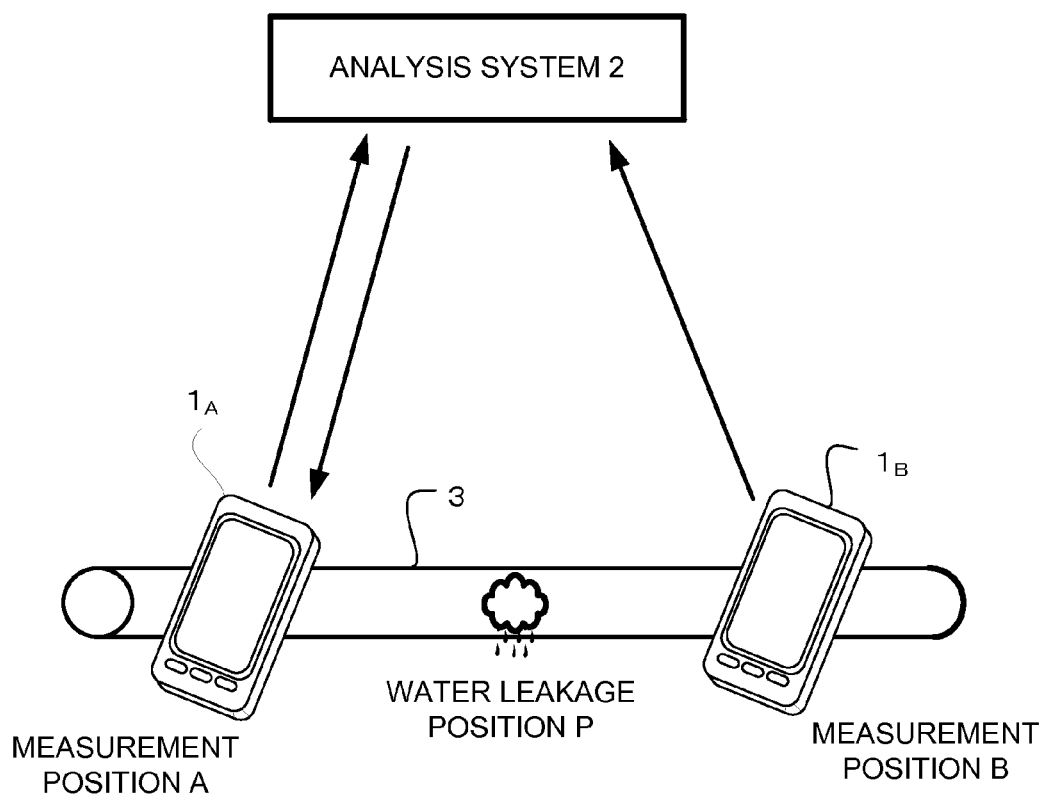
FIG. 1 is a schematic diagram illustrating a configuration of a leakage position analysis system according to an embodiment of the present invention.

The present invention is characterized in that a correlation profile including a cross-correlation function obtained from measurement data measured at at least a pair of measurement positions and position information for the measurement positions, and the correlation profile at the time of leakage determination including a cross-correlation function obtained from the measurement data measured at the pair of measurement positions and the position information for the measurement positions are compared, and further leakage is determined.

Here, the correlation profile includes not only the correlation profile obtained by the measurement in the past, for example, but also the correlation profile measured after the determination of the leakage. Further, in this case, the correlation profile measured after the determination of the leakage and the correlation profile measured for the further determination of the leakage are compared.

Here, the correlation profile includes the cross-correlation function obtained from measurement data measured at at least a pair of measurement positions and the position information for the measurement positions.

Here, the cross-correlation function is, for example, a cross-correlation function obtained from pipe vibration data measured at a pair of (two) measurement positions.

Further, the correlation profile may include environmental information at the time of the measurement.

Here, the environmental information is information about measured conditions (environment), and includes, for example, year, month, day, hour, minute and a day of the week of the measurement, weather information such as rainfall, temperature and humidity, information about sound at the measurement position (information about a neighboring traffic volume and engineering works, and sound in the air), and leakage information about the leakage. In addition, the leakage information may include not only the presence or absence of original leakage and positions thereof, such as water, etc. leak from pipes, but also the presence or absence of the leakage and positions thereof in which a simulated leakage sound similar to the leakage sound is generated (hereinafter, similarly referred to as injected) in the pipes or is artificially generated. Further, the leakage information may include a volume and a spectrum of the leakage sound.

Further, in the correlation profile, preprocessing may be performed by a plurality of cross-correlation functions as measures against sound. For example, cross-correlation functions may be repeatedly calculated for a fixed period of time (for example, one day or one week).

(1) A minimum is taken in each position (time): a minimum correlation profile, (2) An average is taken in each position: an average correlation profile, (3) A maximum is taken in each position: a maximum correlation profile, and (4) A short-time average value (for example, one minute) is taken in each position, and further it is aligned in plurality and the minimum is taken: a minimum average correlation profile.

In addition, a standard deviation in each position may be recorded.

The correlation profile prepared as described above and the correlation profile at the time of the leakage determination are compared and the leakage is determined. For example, the correlation profile obtained at the time of the leakage determination and the correlation profile on the same day of the week in the past are used; further, when a new peak is present in which a peak of the cross-correlation function of the correlation profile at the time of the leakage determination is different from that of the cross-correlation function of the correlation profile in the past, the leakage may be probably determined to occur. Further, the environmental information of the correlation profiles to be compared is preferably the same; however, it is difficult to obtain the same information, and therefore some differences may be present.

Further, when a correlation method is used, not only a peak position but also a water leakage position can be estimated.

Further, when the simulated leakage sound is included in the environmental information, information about the simulated leakage sound can be used. It is considered that as a simulated water leakage sound generation device that generates the simulated leakage sound, a device that gives strong vibrations by a magnetostrictive element, or a device that is constituted of a piezoelectric element, etc. is used. When the simulated leakage sound is included in the environmental information, a peak depending on a generation position and a size of the simulated leakage sound is present in the correlation profile (cross-correlation function).

When the leakage is actually detected by the above correlation profile, the correlation profile and a correlation profile in which a peak of the simulated leakage sound is present near the peak position of the leakage are compared; thereby, a generation position of the simulated water leakage sound can be used as a reference, and therefore an estimation accuracy of the leakage position can be improved. In the correlation method, a propagation speed changes depending on installation conditions of pipes, or a time deviates in calculation of the cross-correlation function, and therefore a lot of estimation errors are generated; however, when a known peak is used as the reference, only a slight relative error to the reference occurs as the estimation error. When there is a lot of noise, a peak may not be viewed for the simulated water leakage sound; however, only when the peak position is obtained for improving the estimation accuracy of the leakage position, a large simulated water leakage sound may be generated.

Further, when a relationship between a size of vibrations given as the simulated leakage sound and that of the simulated leakage is recorded, in the case in which the leakage is actually detected, heights of the peaks of the correlation profiles are compared, and thereby an amount (size) of the leakage can be estimated. For example, in the case in which leaks occur at a plurality of positions at the time of disaster, the above leakage amount is effective as information for determining priority of restoration works.

Further, a vibration propagation speed between the reference positions can be calculated from the measurement data by which the simulated leakage sound is given. Conventionally, a database relating to the vibration propagation speed classified only by a kind of the pipe is used; however, an error may be increased by an influence of the installation conditions or the like.

However, when the vibration propagation speed between the reference positions (in each section) is calculated from the measurement data by which the simulated leakage sound is given and a database is compiled, the database is used together with the above-described correlation profile, and thereby the estimation accuracy of the water leakage position can be improved.

As described above, according to the present invention, the leakage can be determined in consideration of ambient surrounding.

Hereinafter, a specific embodiment will be described.

First Embodiment

FIG. 1 is a schematic diagram illustrating a configuration of a leakage analysis system according to a first embodiment of the present invention.

The leakage analysis system includes at least two or more measurement terminals 1 and an analysis system 2. In the present embodiment, positions to measure leakage detection are set to a position A and a position B, respectively, and devices arranged in respective positions are described with subscripts A and B. For example, the measurement terminal 1 arranged in the position A is described as a measurement terminal $1_A$, and the measurement terminal 1 arranged in the position B is described as a measurement terminal $1_B$. Further, a position in which the leakage occurs in a pipe 3 is described as a position P. In the following description, water leakage of a water pipe will be described as an example; however, the present invention is not limited thereto, and can be also used for leakage detection in fluid tubing of petroleum gases, etc.

Figure 2:
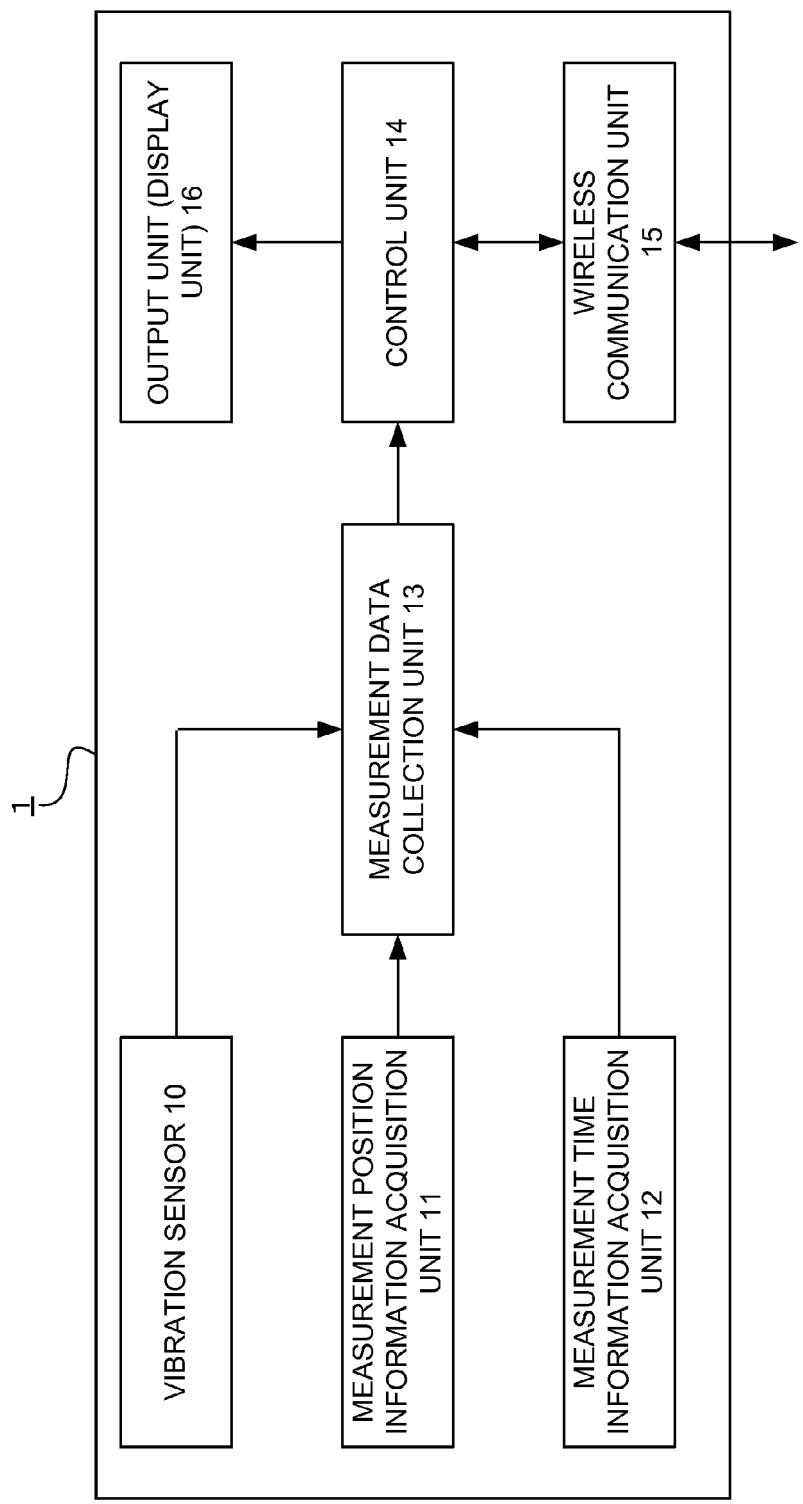
FIG. 2 is a block diagram illustrating a measurement terminal 1.

The measurement terminal 1 will be described. FIG. 2 is a block diagram illustrating the measurement terminal 1.

The measurement terminal 1 includes a vibration sensor 10, a measurement position information acquisition unit 11, a measurement time information acquisition unit 12, a measurement data collection unit 13, a control unit 14, a wireless communication unit 15, and an output (display) unit 16.

The vibration sensor 10 measures pipe vibrations of the pipe 3. Further, the vibration sensor 10 supplies waveform vibration data indicating the measured pipe vibrations to the measurement data collection unit 13.

The measurement position information acquisition unit 11 acquires measurement positions, and is, for example, a GPS or the like. Further, the measurement position information acquisition unit 11 supplies the acquired measurement position information to the measurement data collection unit 13.

The measurement date information acquisition unit 12 acquires a measurement time. In the measurement date information acquisition unit 12, for improving a leakage analysis accuracy as described later, it is preferable that the time is matched with each other between the measurement terminals 1. Further, the measurement date information acquisition unit 12 supplies the acquired measurement date information to the measurement data collection unit 13.

The measurement data collection unit 13 supplies the collected measurement data (waveform vibration data, measurement position information, and measurement date information) to the control unit 14.

The control unit 14 transmits the measurement data from the measurement data collection unit 13 to the analysis system 2 via the wireless communication unit 15. As described later, the control unit 14 further outputs analysis results received from the analysis system 2 to the output unit (display unit) 16.

The output unit (display unit) 16 is a display or the like.

A dedicated terminal may be used as the measurement terminal 1; further, for example, by a terminal such as an existing smartphone, application for realizing the above-described function can be introduced into a smartphone to thereby realize the measurement terminal 1.

Figure 3:
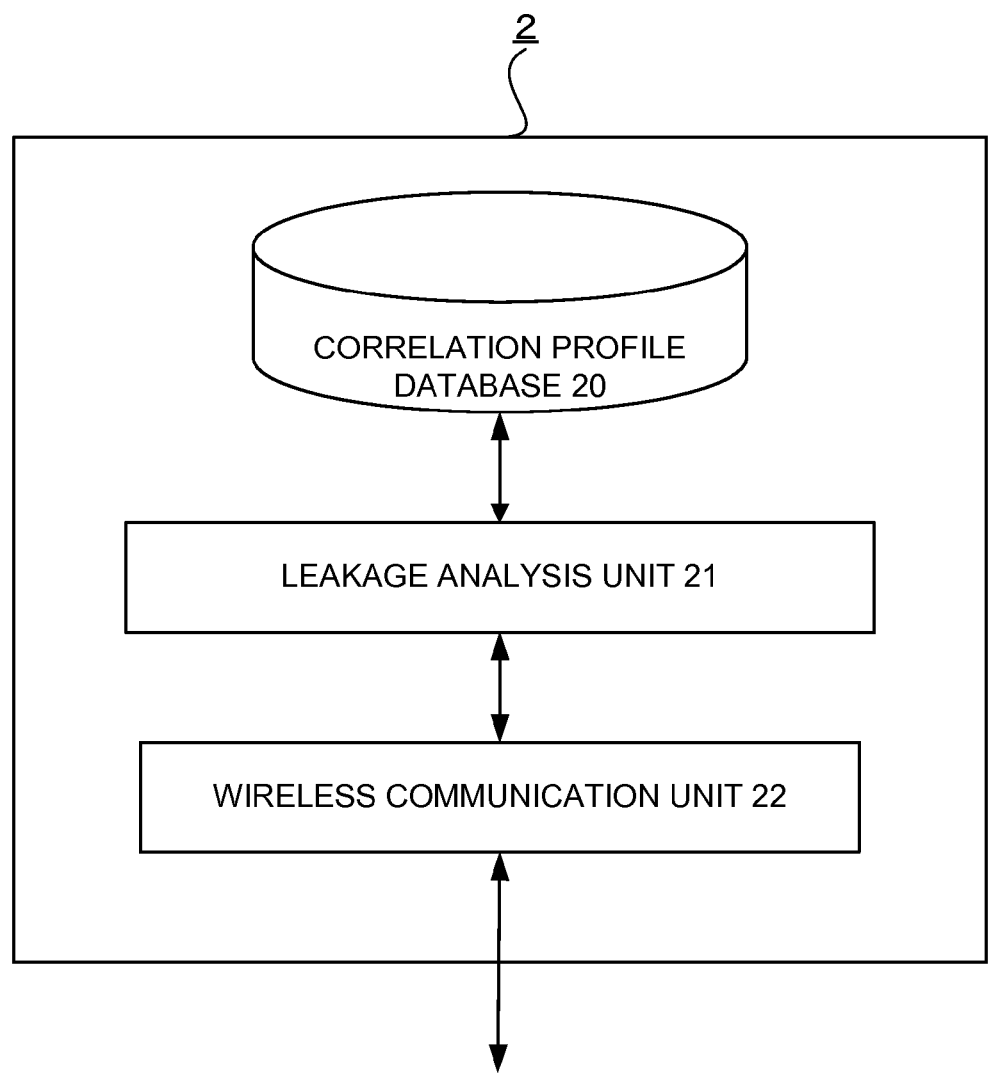
FIG. 3 is a block diagram illustrating an analysis system 2.

Next, the analysis system 2 will be described. FIG. 3 is a block diagram illustrating the analysis system 2.

The analysis system 2 includes a correlation profile database 20, a leakage analysis unit 21, and a wireless communication unit 22.

The correlation profile database 20 stores a correlation profile including the cross-correlation function calculated based on the vibration data measured by the vibration sensor pair arranged in the pipe and the environmental information at the time of the measurement. As illustrated in FIG. 4, examples of the correlation profile include a cross-correlation function, a position of a vibration sensor pair, year, month, day, hour, and minute, a day of the week at the time of the measurement, weather (rainfall, temperature, humidity, etc.), sound information (information about a neighboring traffic volume and engineering works, and sound in the air), and leakage information (the presence or absence of leakage, leakage sound generation position, a size and a spectrum of the leakage sound).

The cross-correlation function $\phi_{AB}(\tau)$ is calculated by the following formula (1) from the vibration data $Y_A(\tau)$ measured by the vibration sensor A and the vibration data $Y_B(t)$ measured by the vibration sensor B.

$$\Phi_{AB}(\tau)=\int_{-t}^{t0} Y_A(t)Y_B(t+\tau)dt \qquad (1)$$

Figure 5:
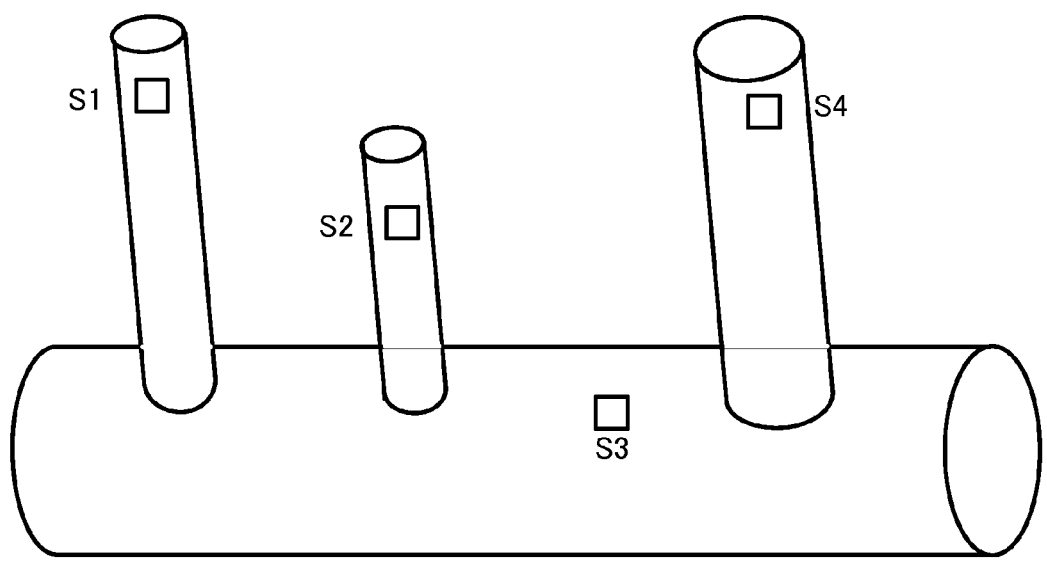
FIG. 5 illustrates an analysis of a leakage position.

As illustrated in FIG. 5, for example, the vibration sensors are arranged in a plurality of positions S1, S2, . . . of the pipe, and the cross-correlation function between two points is calculated by the above formula (1) from the vibration data measured at each sensor position. For example, when the simulated leakage sound is generated (injected) in the pipe by a simulated leakage sound generation device (simulated leakage sound injection device) at the time of the measurement, an injection position of the simulated leakage sound, a size of the leakage sound, or the like is recorded as the leakage information.

The leakage analysis unit 21 calculates the cross-correlation function by the above formula (1) from the vibration data $Y_A(t)$ measured by the measurement terminal $1_A$ and the vibration data $Y_B(t)$ measured by the measurement terminal $1_B$. Further, the leakage analysis unit 21 acquires the environmental information such as weather and sound information at that time. Further, the leakage analysis unit 21 checks the calculated cross-correlation function and the environmental information with the correlation profile of the correlation profile database 20 and performs analysis of the leakage, and further transmits analysis results to the measurement terminals 1.

Specifically, the leakage analysis unit 21 calculates the cross-correlation function $\Phi_{AB}(\tau)$ by the above formula (1) from the vibration data $Y_A(t)$ measured by the measurement terminal $1_A$ and the vibration data $Y_B(t)$ measured by the measurement terminal $1_B$.

Next, the leakage analysis unit 21 searches the correlation profile database 20 based on positions of the measurement terminal $1_A$ and the measurement terminal $1_B$, measurement date, and sound conditions; further, the leakage analysis unit 21 compares the corresponding cross-correlation function and the cross-correlation function $\Phi_{AB}(\tau)$ calculated by the vibration data from the measurement terminals $1_A$ and $1_B$, and performs analysis of the presence or absence of the leakage, the leakage position, and the like.

The analysis results calculated as described above are transmitted to the measurement terminals 1 by the wireless communication unit 22.

Figure 6:
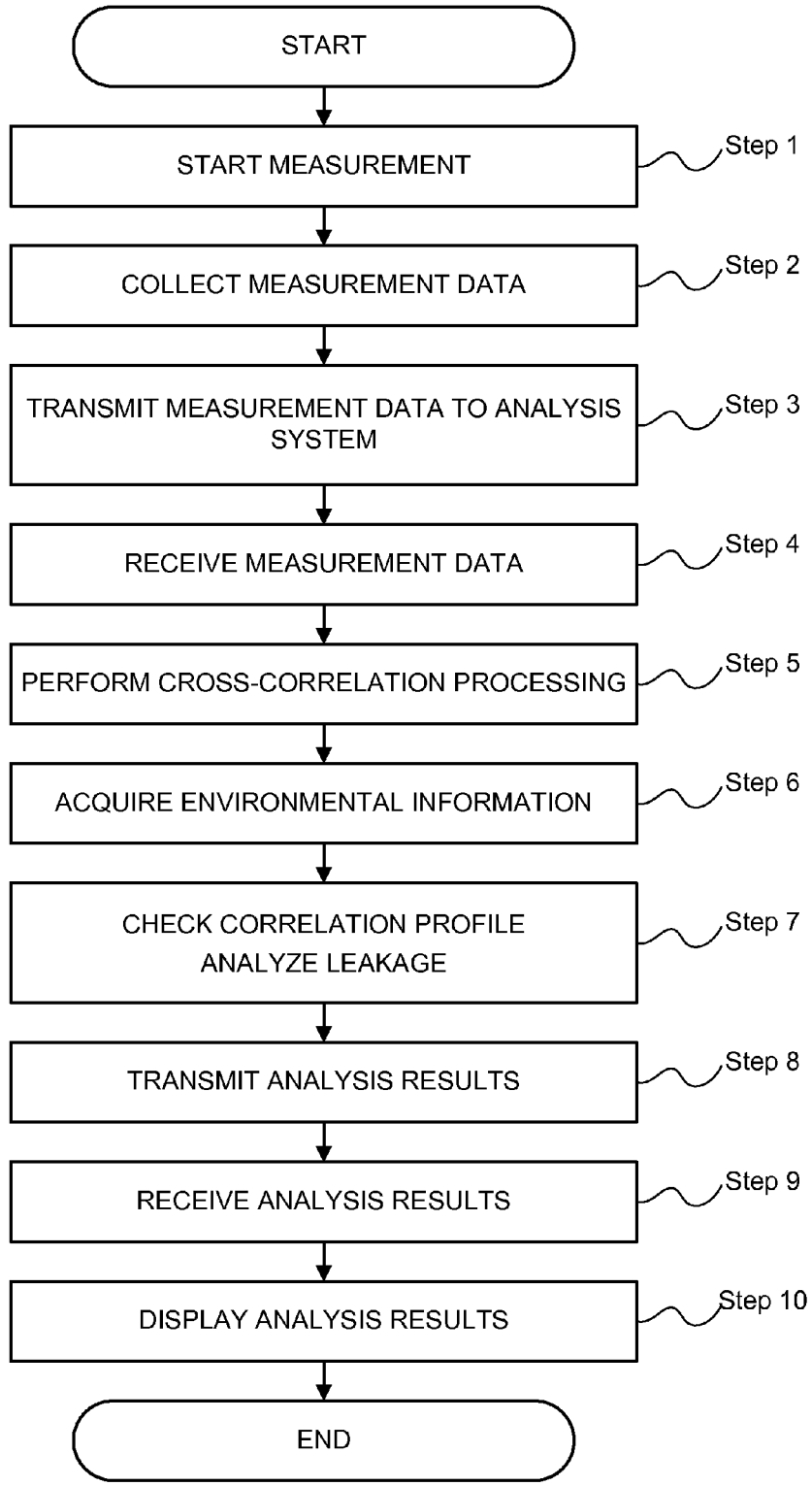
FIG. 6 is a flowchart of operations of the leakage position analysis system according to the present embodiment.

Next, operations of the leakage analysis system according to the present embodiment will be described with reference to a flowchart of FIG. 6. Suppose that an examiner installs the measurement terminal $1_A$ in the position A and installs the measurement terminal $1_B$ in the position B. Further, the leakage position, which is the analysis result, is supposed to be transmitted only to the measurement terminal $1_A$; further, may be transmitted also to the measurement terminal $1_B$.

In the position A and the position B, the waveform vibration, the measurement position information, and the measurement date information are first measured by the vibration sensor 10, the measurement position information acquisition unit 11, and the measurement date information acquisition unit 12 of each of the measurement terminals $1_A$ and $1_B$ (step S1).

The measurement data collection unit 13 collects the measurement data (the waveform vibration data, the measurement position information, and the measurement date information) (step S2).

The control unit 14 transmits the measurement data from the measurement data collection unit 13 to the analysis system 2 via the wireless communication unit 15 (step S3).

The analysis system 2 receives (the waveform vibration data, the measurement position information, and the measurement date information) via the wireless communication unit 22 (step S4).

The leakage analysis unit 21 of the analysis system 2 subjects the waveform vibration data between two points (the position A and the position B) set as the measurement section to cross-correlation processing (step S5). Further, the leakage analysis unit 21 acquires the environmental information such as weather and sound information at that time (step S6).

The leakage analysis unit 21 searches the correlation profile database 20 for the cross-correlation function corresponding to the measurement positions of two points used at step S5 and the environmental information, etc. acquired at step S6; further, the leakage analysis unit 21 compares the above cross-correlation function and the cross-correlation function $\Phi_{AB}(\tau)$ calculated by the cross-correlation processing and performs detection of the leakage such as the presence or absence of the leakage and the leakage position (step S7). The process permits the leakage analysis processing to be ended.

The analysis results are transmitted to the measurement terminal $1_A$ by the wireless communication unit 22 (step S8).

The measurement terminal $1_A$ receives the analysis results of the leakage detection by the wireless communication unit 15 (step S9). The control unit 14 displays the received analysis results on the output (display) unit 16 (step S10).

As described above, in the first embodiment, the analysis of the leakage detection can be performed by the correlation profile database.

In the present embodiment, described is an example in which the correlation profile database 20 is searched, the corresponding cross-correlation function and the cross-correlation function calculated by the vibration data from the measurement terminals are compared, and an analysis of the presence or absence of the leakage, the leakage position, or the like is performed; further, other configurations may be used. For example, the cross-correlation functions to be compared may be calculated not by searching the correlation profile database 20, but by generating and measuring the simulated leakage sound by the simulated leakage sound generation device through the examiner on the spot. In that case, the two cross-correlation functions to be compared are measured and calculated in similar ambient surrounding. The process permits the object of the present invention to be attained.

Second Embodiment

A leakage position analysis system according to a second embodiment of the present invention will be described.

In the second embodiment, the correlation profile of the cross-correlation function in the case in which the simulated leakage sound is not generated is registered in the correlation profile database 20, and the analysis process for detecting the leakage is performed by the above correlation profile.

A system configuration of the second embodiment is the same as that of the first embodiment. Hereinafter, descriptions will be made with a focus on a characteristic part of the second embodiment.

The leakage analysis unit 21 of the analysis system 2 calculates the cross-correlation function by the above formula (1) from the vibration data $Y_A(t)$ measured by the measurement terminal $1_A$ and the vibration data $Y_B(t)$ measured by the measurement terminal $1_B$. Further, the leakage analysis unit 21 acquires the environmental information such as weather and sound information at that time. Further, the leakage analysis unit 21 searches the correlation profile database 20 based on the environmental information such as a measurement date and weather; further, the leakage analysis unit 21 compares the corresponding cross-correlation function of the correlation profile and the cross-correlation function $\Phi_{AB}(\tau)$ calculated by the vibration data from the measurement terminals $1_A$ and $1_B$, and determines the presence or absence of the leakage.

Figure 7:
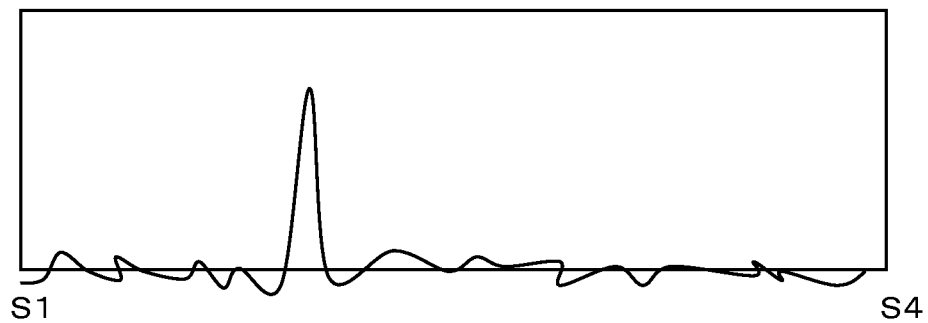
FIG. 7 illustrates a determination of the presence or absence of leakage.
Figure 7:
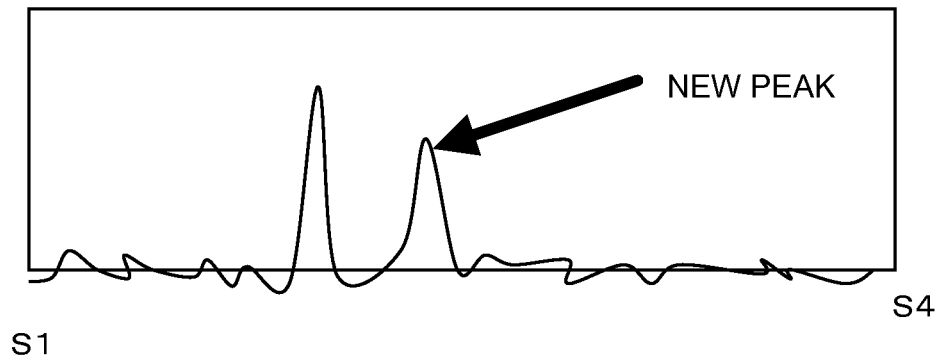

In the determination of the presence or absence of the leakage, when the cross-correlation functions are compared and a new peak is present, the leakage is probably determined to occur (the leakage occurs). As illustrated in FIG. 7, for example, when a cross-correlation function $\phi1$ of the correlation profile and a cross-correlation function $\phi2$ calculated by the measurement are compared, a new peak is present, and therefore the leakage is determined to occur. On the other hand, when a new peak is not present, the leakage is determined not to occur.

The leakage analysis unit 21 transmits analysis results relating to the presence or absence of the leakage to the measurement terminal $1_A$ or $1_B$ via the wireless communication unit 22.

As described above, in the second embodiment, the leakage can be detected by the correlation profile database.

Third Embodiment

A leakage position analysis system according to a third embodiment of the present invention will be described.

In the third embodiment, the correlation profile of the cross-correlation function in the case in which the simulated leakage sound is not generated and the correlation profile in the case in which the simulated leakage sound is generated are registered in the correlation profile database 20, and detection of the leakage and estimation of the leakage position are performed by the above correlation profiles. A system configuration of the third embodiment is the same as that of the first embodiment. Hereinafter, descriptions will be made with a focus on a characteristic part of the third embodiment.

The leakage analysis unit 21 of the analysis system 2 calculates the cross-correlation function by the above formula (1) from the vibration data $Y_A(t)$ measured by the measurement terminal $1_A$ and the vibration data $Y_B(t)$ measured by the measurement terminal $1_B$. Further, the leakage analysis unit 21 acquires the environmental information such as weather and sound information at that time. Further, the leakage analysis unit 21 searches the correlation profile database 20 based on the environmental information such as a measurement date and weather. In this search, as search conditions, it is set that there is no leakage and the correlation profile in which the leakage sound is not generated is searched for. Further, in the same manner as in the second embodiment, the searched cross-correlation function and the cross-correlation function $\Phi_{AB}(\tau)$ calculated by the vibration data from the measurement terminals $1_A$ and $1_B$ are compared and the presence or absence of the leakage is determined. In this determination, when it is determined that there is the leakage, the leakage analysis unit 21 performs estimation of the leakage position. The leakage analysis unit 21 searches the correlation profile database 20 again based on the environmental information such as a measurement date and weather. In this search, as the search conditions, it is set that there is the leakage, and a plurality of the correlation profiles in which the leakage sounds are generated are searched for.

In the estimation of the leakage position, the cross-correlation function of the searched correlation profile and the cross-correlation function calculated by the measurement are compared, the correlation profile to which a position of the peak is nearest is specified, and it is determined that the leakage occurs near this simulated sound generation position.

The leakage analysis unit 21 transmits analysis results relating to the presence or absence of the leakage and the leakage position to the measurement terminal $1_A$ via the wireless communication unit 22.

As described above, in the third embodiment, the leakage can be detected by the correlation profile database and the leakage position can be estimated.

Fourth Embodiment

A leakage position analysis system according to a fourth embodiment of the present invention will be described.

In the fourth embodiment, the correlation profiles in the case in which the simulated leakage sounds are generated are registered in the correlation profile database 20, and estimation of the leakage position is performed by the above correlation profile. A system configuration of the fourth embodiment is the same as that of the first embodiment. Hereinafter, descriptions will be made with a focus on a characteristic part of the fourth embodiment.

The leakage analysis unit 21 of the analysis system 2 calculates the cross-correlation function by the above formula (1) from the vibration data $Y_A(t)$ measured by the measurement terminal $1_A$ and the vibration data $Y_B(t)$ measured by the measurement terminal $1_B$. Further, the leakage analysis unit 21 acquires the environmental information such as weather and sound information at that time. Further, the leakage analysis unit 21 searches the correlation profile database 20 based on the environmental information such as a measurement date and weather; further, the leakage analysis unit 21 compares the corresponding cross-correlation function of the correlation profile and the cross-correlation function $\Phi_{AB}(\tau)$ calculated by the vibration data from the measurement terminals $1_A$ and $1_B$, and estimates the section in which the leakage position is present.

In the estimation of the section in which the leakage position is present, peak positions of the respective cross-correlation functions are compared; further, the section is found that is determined by the peak position of the correlation profile and in which the cross-correlation function $\Phi_{AB}(\tau)$ calculated by the vibration data from the measurement terminals $1_A$ and $1_B$ is present, and the leakage position is determined to be present in this section.

Figure 8:
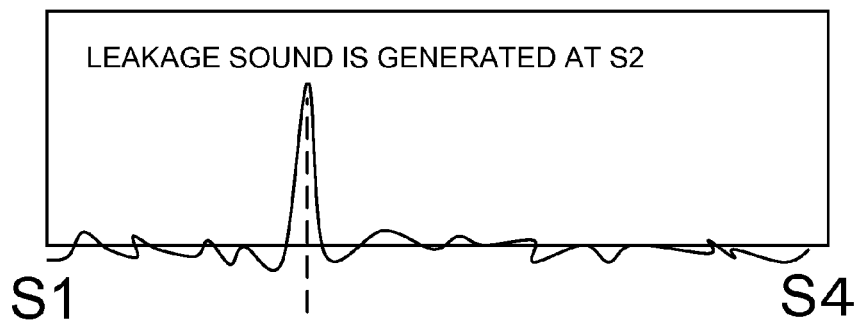
FIG. 8 illustrates the determination of a position of the leakage.
Figure 8:
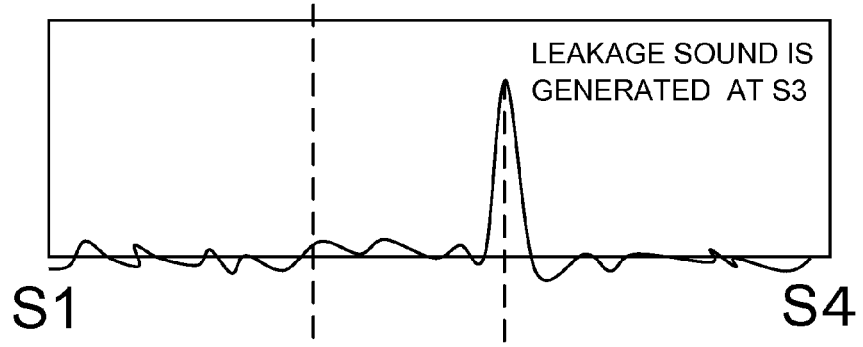
Figure 8:
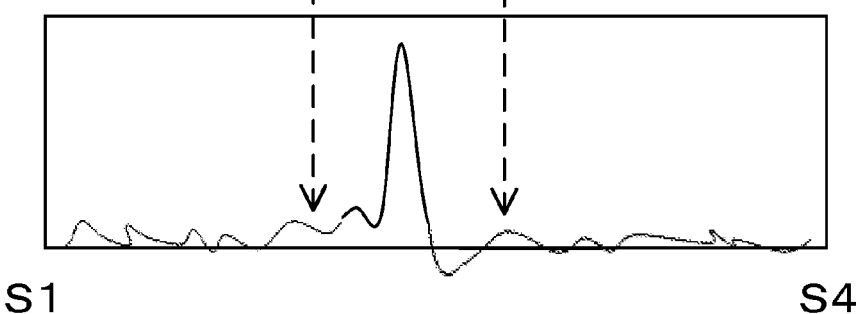

Suppose, for example, that as illustrated in FIG. 8, the cross-correlation function φ1 (leakage sound generation position: S2) and the cross-correlation function φ2 (leakage sound generation position: S3) registered in the correlation profile database 20 and the cross-correlation function $\Phi_{AB}(\tau)$ calculated by the vibration data from the measurement terminals $1_A$ and $1_B$ are present; in this case, a peak of the cross-correlation function $\Phi_{AB}(\tau)$ is present between a peak of the cross-correlation function φ1 and that of the cross-correlation function φ2, and therefore the leakage position of this case is estimated to be present between S2 and S3. As the section is narrower, an accuracy of the position estimation is more improved, and therefore the section that is minimized is preferably found.

The leakage analysis unit 21 transmits analysis results relating to the leakage position to the measurement terminal $1_A$ via the wireless communication unit 22.

As described above, in the fourth embodiment, the leakage position can be estimated by the correlation profile database.

In addition, both the correlation profiles in the case in which the simulated leakage sounds are generated are compared, and thereby a secular change of the pipes can be estimated.

By the secular change, for example, when a state of joints, etc. of the pipes changes, or when a state of peripheral earth changes, a propagation characteristic of the simulated water leakage sound changes. Therefore, a position, a height, or a change in a shape of the peak corresponding to the simulated water leakage sound is viewed, and thereby a change in the state of the pipes can be detected.

Fifth Embodiment

A leakage position analysis system according to a fifth embodiment of the present invention will be described.

Figure 9:
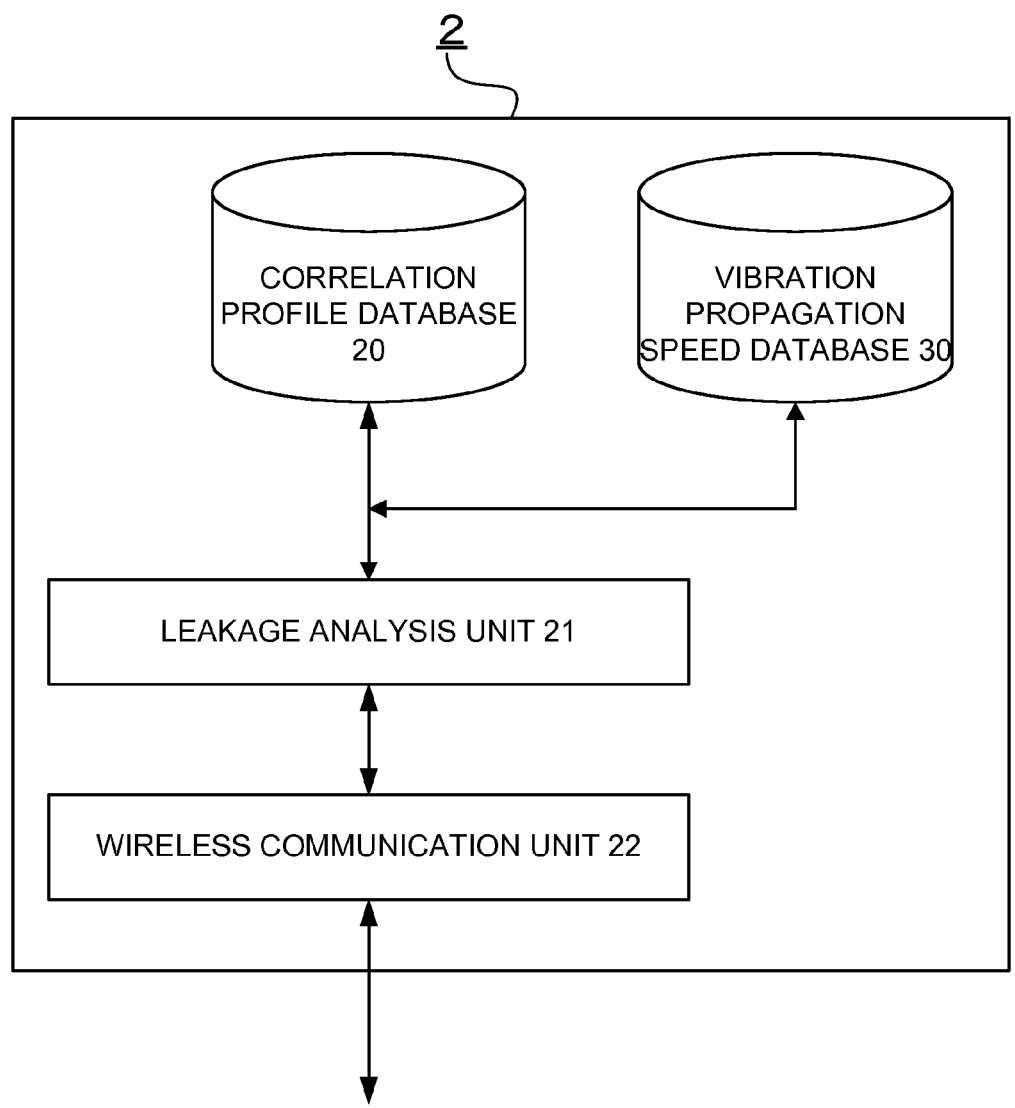
FIG. 9 is a block diagram illustrating the analysis system 2 according to a fifth embodiment.

FIG. 9 is a block diagram illustrating the analysis system 2 according to the fifth embodiment.

In the fifth embodiment, an embodiment will be described that has a vibration propagation speed database 30 and improves an accuracy of a leakage position by correlation profiles and the vibration propagation speed database 30 in addition to the above-described correlation profile database 20 of the embodiments.

The vibration propagation speed database 30 is a database in which a configuration of pipes and a vibration propagation speed in each pipe section based on measurement data in which a simulated leakage sound is generated and measured are recorded.

As illustrated in FIG. 10, for example, when the simulated leakage sounds are generated at S2 and S3 and vibration data is measured at S1 and S4, accurate positions of S2 and S3 are found, and therefore the vibration propagation speed of a section C can be calculated. The vibration propagation speed as described above is calculated in each section and a database of the vibration propagation speeds is made.

As described in the above embodiment, the leakage analysis unit 21 determines the leakage by a comparison between the correlation profiles, calculates a maximum of the cross-correlation function $\Phi_{AB}(\tau)$ when the leakage occurs, and calculates a time Δτ of the maximum. Here, the time Δτ is a time difference Δτ between the vibration data $Y_A$ (t) and the vibration data $Y_B$ (t).

Continuously, the vibration propagation speed C corresponding to the section in a position to be determined as the leakage is read from the vibration propagation speed database 30, a value of the time difference Δτ calculated as the vibration propagation speed C is substituted in the formula (2), and a distance $L_{AP}$ from the measurement position A in which the measurement terminal $1_A$ is arranged up to the leakage position P is calculated.

$$L_{AP} = (L_{AB} - C \cdot \Delta\tau)/2 \quad (2)$$

According to the above method, the leakage position can be specified with high accuracy.

In addition, in the above-described embodiment, each unit is composed by hardware; further, may be composed also by programs for instructing an information processing device (CPU) to execute the above-described processing of operations.

In addition, a part or all of the embodiments can be described as in the following supplementary note; however, is not limited thereto.

(Supplementary note 1) A leakage determination method comprising:

comparing a correlation profile including a cross-correlation function obtained from measurement data measured at at least a pair of measurement positions and position information for the measurement positions, and a correlation profile at the time of the leakage determination including the cross-correlation function obtained from the measurement data measured at the pair of measurement positions and the position information for the measurement positions; and determining leakage.

(Supplementary note 2) The leakage determination method described in the supplementary note 1, wherein the correlation profile includes environmental information upon measurement.

(Supplementary note 3) The leakage determination method described in the supplementary note 2, wherein the environmental information includes at least any one of year, month, and day of measurement, measurement time, a day of a week, weather information, sound information, and leakage information.

(Supplementary note 4) The leakage determination method described in any one of the supplementary notes 1 to 3, wherein the cross-correlation function includes a cross-correlation function obtained from measurement data in which a simulated leakage sound is generated and measured at a predetermined position, and the environmental information includes information about the simulated leakage sound.

(Supplementary note 5) The leakage determination method according to Supplementary note 4, wherein the determining leakage comprising:

comparing a correlation profile including information about the simulated leakage sound and a correlation profile at the time of the leakage determination not including information about the simulated leakage sound are compared, and determining a leakage position based on a cross-correlation function of a correlation profile including information about the simulated leakage sound similar to a peak position of the cross-correlation function of the correlation profile at the time of the leakage determination.

(Supplementary note 6) The leakage determination method described in the supplementary note 4, wherein the determining leakage comprising:

comparing a correlation profile including information about the simulated leakage sound and a correlation profile at the time of the leakage determination including information about the simulated leakage sound, and determining a leakage position based on a cross-correlation function of a correlation profile including information about the simulated leakage sound similar to a peak position of the cross-correlation function of the correlation profile upon the determination of the leakage.

(Supplementary note 7) The verification method described in the supplementary note 4 or 5, wherein the determining leakage comprising:

comparing a correlation profile including information about the simulated leakage sound and a correlation profile at the time of the leakage determination not including information about the simulated leakage sound, and determining a leakage position based on based on a height of a peak of a cross-correlation function of a correlation profile upon the determination of the leakage and a height of a peak of a cross-correlation function of a correlation profile including information about the simulated leakage sound.

(Supplementary note 8) The leakage determination method described in any one of the supplementary notes 4 to 6, wherein a vibration propagation speed database is prepared in which a configuration of a pipe and a vibration propagation speed in each pipe section based on measurement data in which a simulated leakage sound is generated and measured are recorded, and wherein the determining leakage comprising determining a leakage position based on the vibration propagation speed database, a correlation profile including information about the simulated leakage sound, and a correlation profile upon determination of leakage including information about the simulated leakage sound.

(Supplementary note 9) A leakage determination system comprising:

a correlation profile database in which a correlation profile including a cross-correlation function obtained from measurement data measured at at least a pair of measurement positions and position information for the measurement positions is stored, a correlation profile acquisition means that acquires a correlation profile at the time of the leakage determination including the cross-correlation function obtained from the measurement data measured at the pair of measurement positions and the position information for the measurement positions; and a leakage determination means that compares a correlation profile of the correlation profile database and the correlation profile acquired by the correlation profile acquisition means and determines leakage (Supplementary note 10) The leakage determination system described in the supplementary note 9, wherein the correlation profile includes environmental information upon measurement.

(Supplementary note 11) The leakage determination system described in the supplementary note 10, wherein the environmental information includes at least any one of year, month, and day of measurement, measurement time, a day of a week, weather information, sound information, and leakage information.

(Supplementary note 12) The leakage determination system described in the supplementary note 10 or 11, wherein the cross-correlation function includes a cross-correlation function obtained from measurement data in which a simulated leakage sound is generated and measured at a predetermined position, and the environmental information includes information about the simulated leakage sound.

(Supplementary note 13) The leakage determination system described in the supplementary note 12, wherein the leakage determination means:

compares a correlation profile including information about the simulated leakage sound and a correlation profile at the time of the leakage determination not including information about the simulated leakage sound, and determines a leakage position by a cross-correlation function of a correlation profile including information about the simulated leakage sound similar to a peak position of the cross-correlation function of the correlation profile upon the determination of the leakage.

(Supplementary note 14) The leakage determination system described in the supplementary note 12, wherein
the leakage determination means:
compares a correlation profile including information about the simulated leakage sound and a correlation profile at the time of the leakage determination including information about the simulated leakage sound, and
determines a leakage position by a cross-correlation function of a correlation profile including information about the simulated leakage sound similar to a peak position of the cross-correlation function of the correlation profile upon the determination of the leakage.

(Supplementary note 15) The leakage determination system described in the supplementary note 12 or 13, wherein
the leakage determination means:
compares a correlation profile including information about the simulated leakage sound and a correlation profile at the time of the leakage determination not including information about the simulated leakage sound, and
estimates a leakage amount based on a height of a peak of a cross-correlation function of a correlation profile upon the determination of the leakage and a height of a peak of a cross-correlation function of a correlation profile including information about the simulated leakage sound.

(Supplementary note 16) The leakage determination system described in any one of the supplementary notes 12 to 14, further comprising a vibration propagation speed database in which a configuration of a pipe and a vibration propagation speed in each pipe section based on measurement data in which a simulated leakage sound is generated and measured are recorded, wherein
the leakage determination means determines leakage based on the vibration propagation speed database, a correlation profile including information about the simulated leakage sound, and a correlation profile at the time of the leakage determination including information about the simulated leakage sound.

(Supplementary note 17) A program for causing a computer to perform a procedure including:
comparing a correlation profile including a cross-correlation function obtained from measurement data measured at at least a pair of measurement positions, and position information for the measurement positions, and
a correlation profile at the time of the leakage determination including a cross-correlation function obtained from the measurement data measured at the pair of measurement positions, and the position information for the measurement positions; and
determining leakage.

This application is based upon and claims the benefit of priority of the prior Japanese Patent Application No. 2012-218037, filed on Sep. 28, 2012, the entire contents of which are incorporated herein by reference.

Each embodiment as described above is a mere preferable embodiment of the present invention and thus the present invention will not be limited only to the embodiment. It is possible to carry out the present invention with various changes and modifications without departing from the spirit and scope of the invention.

REFERENCE SIGNS LIST $1_A$, $1_B$ Measurement terminal
2 Analysis system
10 Vibration sensor
11 Measurement position information acquisition unit
12 Measurement time information acquisition unit
13 Measurement data collection unit
14 Control unit
15 Wireless communication unit
16 Output (display) unit
20 Pipe profile database
21 Leakage position analysis unit
22 Wireless communication unit
30 Vibration propagation speed database

What is claimed is:
1. A leakage determination method using a computer comprising:
comparing
at least one first correlation profile, the first correlation profile including a first cross-correlation function obtained from measurement data measured at at least a pair of measurement positions, the measurement data being measured by generating a simulated leakage sound at a predetermined position, information about the simulated leakage sound and position information for the measurement positions, and
a second correlation profile at the time of the leakage determination including a second cross-correlation function obtained from measurement data measured at the pair of measurement positions and the position information for the measurement positions;
specifying the first correlation profile including the first cross-correlation function similar to a peak position of the second cross-correlation function included in the second correlation profile; and
determining a leakage position based on the first cross-correlation function included in the specified first correlation profile and the second cross-correlation function included in the second correlation profile.

2. The leakage determination method according to claim 1, wherein
the first correlation profile includes a first environmental information obtained at measurement and the second correlation profile includes a second environmental information obtained at measurement;
the leakage determination method comprises
specifying the first correlation profile, including the first cross-correlation function similar to a peak position of the second cross-correlation function and including the first environmental information similar to the second environmental information included in the second correlation, and
determining a leakage position based on the first cross-correlation function included in the specified first correlation profile and the second cross-correlation function included in the second correlation profile.

3. The leakage determination method according to claim 2, wherein
the first and second environmental information include at least any one of year, month, and day of measurement, measurement time, a day of a week, weather information, sound information, and leakage information.

4. The leakage determination method according to claim 1, wherein the determining leakage comprising:
comparing the first correlation profile including information about the simulated leakage sound and a third correlation profile at the time of the leakage determination including information about the simulated leakage sound, and determining a leakage position based on the first cross-correlation function of the first correlation profile similar to a peak position of a third cross-correlation function of the third correlation profile.

5. The leakage determination method according to claim 1, wherein the determining leakage comprising:
comparing the first correlation profile including information about the simulated leakage sound and the second correlation profile at the time of the leakage determination not including information about the simulated leakage sound, and
determining a leakage amount based on based on a height of a peak of the second cross-correlation function of the second correlation profile and a height of a peak of the first cross-correlation function of the first correlation profile.

6. The leakage determination method according to claim 1, wherein a vibration propagation speed database is prepared in which a configuration of a pipe and a vibration propagation speed in each pipe section based on measurement data in which a simulated leakage sound is generated and measured are recorded, and
wherein the determining leakage comprising determining a leakage position based on the vibration propagation speed database, the first correlation profile, and the second correlation profile.

7. A leakage determination system comprising:
a correlation profile database in which at least one first correlation profile, the first correlation profile including a cross-correlation function obtained from measurement data measured at at least a pair of measurement positions, the measurement data being measured by generating a simulated leakage sound at a predetermined position, information about the simulated leakage sound and position information for the measurement positions, is stored, and
a processor programmed to:
acquire a second correlation profile at the time of the leakage determination including a second cross-correlation function obtained from the measurement data measured at the pair of measurement positions and the position information for the measurement positions; and
specify the first correlation profile including the first cross-correlation function similar to a peak position of the second cross-correlation function included in the second correlation profile; and
determine a leakage position based on the first cross-correlation function included in the specified first correlation profile and the second cross-correlation function included in the acquired second correlation profile.

8. The leakage determination system according to claim 7, wherein
the first correlation profile includes a first environmental information obtained at upon measurement and the second correlation profile includes a second environmental information obtained at measurement;
the processor programmed to
specify the first correlation profile, including the first cross-correlation function similar to a peak position of the second cross-correlation function and including the first environmental information similar to the second environmental information included in the second correlation, and
determine a leakage position based on the first cross-correlation function included in the specified first correlation profile and the second cross-correlation function included in the acquired second correlation profile.

9. The leakage determination system according to claim 8, wherein
the first and second environmental information include at least any one of year, month, and day of measurement, measurement time, a day of a week, weather information, sound information, and leakage information.

10. The leakage determination system according to claim 7, wherein the processor further programmed to
acquire a third correlation profile at the time of the leakage determination including a third cross-correlation function obtained from the measurement data measured at the pair of measurement positions, the measurement data being measured by generating a simulated leakage sound at a predetermined position, information about the simulated leakage sound and the position information for the measurement positions;
compare the third correlation profile and the third correlation profile; and
determine a leakage position by the first cross-correlation function of the first correlation profile similar to a peak position of the third cross-correlation function of the third correlation profile.

11. The leakage determination system according to claim 10, further comprising a vibration propagation speed database in which a configuration of a pipe and a vibration propagation speed in each pipe section based on measurement data in which a simulated leakage sound is generated and measured are recorded,
wherein the processor further programmed to determine leakage based on the vibration propagation speed database, the first correlation profile, and the third correlation profile.

12. The leakage determination system according to claim 7, wherein the processor further programmed to:
compare the first correlation profile and the second correlation profile, and
estimate a leakage amount based on a height of a peak of the second cross-correlation function of the second correlation profile and a height of a peak of the first cross-correlation function of the second correlation profile.

13. A non-transitory computer readable storage medium storing a program for causing a computer to perform a procedure comprising:
comparing
at least one first correlation profile, the first correlation profile including a first cross-correlation function obtained from measurement data measured at at least a pair of measurement positions, the measurement data being measured by generating a simulated leakage sound at a predetermined position, information about the simulated leakage sound and position information for the measurement positions, and
a second correlation profile at the time of the leakage determination including a second cross-correlation function obtained from the measurement data measured at the pair of measurement positions, and the position information for the measurement positions;
specifying the first correlation profile including the first cross-correlation function similar to a peak position of the second cross-correlation function included in the second correlation profile; and
determining a leakage position based on the first cross-correlation function included in the specified first correlation profile and the second cross-correlation function included in the second correlation profile.

* * * * *